United States Patent Office 3,483,007
Patented Dec. 9, 1969

3,483,007
AQUEOUS CEMENT SLURRY AND
METHOD OF USE
Fred E. Hook, Tulsa, Okla., assignor to The Dow
Chemical Company, Midland, Mich., a corporation of Delaware
No Drawing. Filed July 7, 1966, Ser. No. 568,712
Int. Cl. C04b 7/12, 7/32
U.S. Cl. 106—93                            4 Claims

ABSTRACT OF THE DISCLOSURE

A new improved aqueous hydraulic cement composition and method of use thereof, particularly in well-cementing operations, said composition having low fluid-loss properties and relatively low viscosity, whereby loss of fluid to porous media in contact therewith is lessened by admixture with water and cement, of a hydroxyalkyl ether cellulose whereby the usual increase in viscosity thereof, due to the ether is lessened by admixture therewith of not less than 10 percent, by weight of water present, of sodium chloride.

---

The invention is an improvement in the art of making and using aqueous hydraulic cement slurries, particularly for use wherein the slurry is emplaced or injected into a cavity or hole in the ground.

Cementing operations wherein an aqueous hydraulic cement slurry is brought into contact with the earth, particularly the more porous earth structures such as are encountered in cementing well casing in place or in squeeze cementing to inhibit water intrusion or in cementing behind tunnel walls, shaft liners, or the like have problems associated therewith due to excessive loss of water from the cement slurry between the time of emplacement and time of set. Such loss of water is detrimental to a good quality set cement and, in the case of cement slurries used in fluid-producing reservoirs, results in reservoir damage.

Efforts have been made to lessen the loss of water from an aqueous hydraulic cement slurry, usually by admixing an additive therewith known as a fluid-loss control agent. Among the more effective of agents known to have some value for this use is sodium polyvinyltoluene sulfonate. However, agents which have been used for this purpose have not been fully satisfactory for one reason or another.

The incorporation of carboxymethyl hydroxyethyl cellulose into aqueous hydraulic cement slurries with formaldehyde to discourage certain contaminants therein is disclosed in U.S. Patent 3,197,316.

A need exists for an improved method of cementing casing in wells for squeeze cementing to inhibit encroaching water and brines, and for use in terranean or subterranean formations in general wherein the loss of fluid from an aqueous hydraulic cement slurry to the formation during the setting period is lessened without adverse effects on the rheological properties of the aqueous cement slurries so made.

The invention contemplates an improved aqueous hydraulic cement composition and method of use. The composition consists essentially by weight of between about 35 and 65 parts of water, usually between about 0.01 and 2.5 parts of a water-soluble hydroxyalkyl cellulose ether, a relatively high concentration of an alkali metal or alkaline earth metal salt, in an amount of at least 5% by weight and preferably at or near saturation at the temperature of the composition, and 100 parts of an hydraulic cement. The composition may be prepared in any convenient manner. It is sometimes made by preparing a brine, admixing therewith the hydroxyalkyl cellulose ether, and thereafter admixing the hydraulic cement. In some instances it is preferred to have individual supply sources for each of the components and conduct them into a common mixer just prior to injecting the resulting composition down a wellbore of a well being cemented.

The hydroxyalkyl cellulose ethers which are required to be employed in the practice of the invention are: hydroxyethyl cellulose, hydroxypropyl cellulose, and hydroxybutyl cellulose.

Although as aforesaid, the hydroxyalkyl cellulose ether additive may be employed in as small an amount as about 0.01% by weight of the aqueous fluid employed and the maximum amount usually not being in excess of about 2.5% by weight, the amount recommended to employ is between about 0.10% and 1.0% by weight of the aqueous cement slurry.

A method of prepairing the water-soluble hydroxyalkyl cellulose ethers for use in the practice of the invention is as follows.

An alkali cellulose may be first prepared by reacting a source of cellulose, usually cotton linters or wood pulp, with an aqueous solution of NaOH, e.g. one of a 25% to 50% by weight, in a suitable reactor, from which air has been evacuated. A preferred weight ratio of NaOH to cellulose is from 0.5 to 1.5, 0.9 to 1.1 commonly being employed, and a water to cellulose ratio of from 1.0 to 2.0 of water to 1 of cellulose.

Alkali cellulose so produced is reacted with a selected olefin oxide, e.g. ethylene oxide or propylene oxide or with 2-chloroethanol or 1-chloro-2-propanol (it being theorized in the latter case that the chlorohydrin is converted in situ to the corresponding oxide). The range of the olefin oxide or chlorohydrin employed is that which results in the desired average D.S. (degree of substitution) which may be from 0.25 to 2.5. A substitution of at least 1.0 is provided where complete solubility of the ether in cold water is desired.

Other methods of preparing hydroxyalkyl cellulose ethers include the slurry method, e.g., as described in U.S. Patent 2,572,039, the vacuum method, e.g., as described in U.S. Patent 2,469,764, and that of treating a high-cellulose pulp with NaOH similarly to the preparation of viscose followed by treatment with excess of an alkylene chlorohydrin, e.g., as described in U.S. Patent 2,172,109.

A formula for hydroxyethyl cellulose having a total D.S. of 0.37 is shown on page 901 of High Polymers, vol. V, part II, 2nd ed., published by Interscience Publishers, New York, N.Y.

Illustrative of salts of the alkali metal or alkaline earth metal to employ are the halides, nitrates, acetates, phosphates, or sulfates thereof. The salt may be added as a solid or as a brine. If desired, a natural brine of sufficient concentration may be employed in the invention. NaCl is the preferred salt to employ.

Any portland, aluminous, or pozzolanic hydraulic cement may be employed. Particularly significant for use in the invention are those designated Classes A to F, as described in API RP 10A, 10th ed. (March 1964), published by the American Petroleum Institute, New York, N.Y.

To show the efficacy of the invention, standard tests were conducted demonstrating the reduced fluid loss of aqueous hydraulic cement slurries prepared in accordance therewith and the absence of any appreciable adverse effect on the rheological properties of the slurry.

The examples of the invention were conducted, in general, by admixing water, salt, hydroxyalkyl cellulose ether, and an hydraulic cement together until substantial homogeneity was attained. The order of admixture is not important, but some advantages are obtained by first preparing an inorganic salt, usually NaCl, brine, admixing the cellulose ether therewith and thereafter admixing the cement with the cellulose ether and brine. In some instances, although usually not deemed particularly advantageous, an anti-foaming agent is employed, usually being added to the water as one of the first ingredients. Illustrative of such agents are polyoxyalkylene glycols having an average molecular weight of from 2,000 to 6,000 tributyl phosphate, and liquid silicones.

In the art of cementing and especially cementing oil, gas, or water wells, it is important that the turbulence of the aqueous cement slurry during emplacement thereof be increased if possible, or at least not be decreased to a perceptible extent, e.g. by additives, at any given injection rate. For the importance of attaining and maintaining turbulent flow in such cement slurries, it is suggested that reference be made to S.N. 598,664, filed by Hook, Kucera, and Scott on Dec. 2, 1966. Turbulent properties of a cement slurry are ascertained by obtaining $n$ and $ty$ values. For a detailed explanation of $n$ and $ty$ values, is suggested that S.N. 598,664 be further consulted. As stated therein, turbulence is encouraged when either the $n$ or $ty$ value is low and particularly when both values are low. A low $n$ value indicates an early tendency to turbulence as movement of the slurry begins; a low $ty$ value indicates a sustained tendency to turbulence after continued motion of the cement slurry at any given pumping rate of the slurry. Usually a change in either value is accompanied by some change in the same direction in the other value so that calculating only one value is indicative of the turbulence of a given slurry.

Series one

These examples were conducted by admixing at room temperature by weight 0.5 part of hydroxyethyl cellulose (sometimes abbreviated HEC) with 46 parts of water, dividing the cellulose ether aqueous compositions into aliquot portions, admixing the amount of NaCl based on the weight of water set out in Table I below to the aliquot portions of the water containing the HEC, and thereafter admixing 100 parts of class A portland cement to each aliquot portion. The test values set out in Table I were then obtained on each sample at 100° F.

The HEC of varying molecular weight was dissolved in water in either a 2% or 3% by weight of HEC and the viscosity taken. The amount of HEC dissolved and the resulting viscosities are shown in Table I. The higher viscosities at a given percent solution shows higher molecular weight.

TABLE I.—AQUEOUS CEMENT SLURRY [1] AND ADDITIVES AS SHOWN

| Test identification | Parts of NaCl by weight of H₂O | 0.5 part of HEC added as aqueous solution | | Density of slurry in lb. per gallon | $n$ value | $ty$ value | Fluid loss in ml./ 30 min. |
|---|---|---|---|---|---|---|---|
| | | Wt. percent aqueous solution | Viscosity in cps. | | | | |
| A | None | 3 | 75 to 150 | 15.6 | 0.027 | 1.01 | 548 |
| B | None | 3 | 150 to 400 | 15.6 | 0.038 | 0.70 | 268 |
| C | None | 2 | 150 to 400 | 15.6 | 0.084 | 2.10 | 186 |
| D | None | 2 | 4,500 to 6,500 | 15.6 | (Cement slurry gelled) | | |
| 1 | 18 | 3 | 75 to 150 | 15.9 | 0.38 | 0.87 | 208 |
| 2 | 18 | 3 | 150 to 400 | 15.9 | 0.035 | 0.53 | 163 |
| 3 | 18 | 2 | 150 to 400 | 15.9 | 0.065 | 0.90 | 93 |
| 4 | 18 | 2 | 4,500 to 6,500 | 15.9 | 0.131 | 3.85 | 60 |
| 5 | 37 | 3 | 75 to 150 | 16.1 | 0.30 | 1.05 | 181 |
| 6 | 37 | 3 | 150 to 400 | 16.1 | 0.005 | 0.38 | 117 |
| 7 | 37 | 2 | 150 to 400 | 16.1 | 0.021 | 0.41 | 83 |
| 8 | 37 | 2 | 4,500 to 6,500 | 16.1 | 0.034 | 0.64 | 49 |

[1] In each test 100 parts of class A portland cement and 46 parts of water by weight were used with the additional ingredients shown in the table. All tests were run at 100° F.

Series two

This series of examples was conducted similarly to series one except that instead of class A cement, a 50/50 by volume class A pozzalanic cement was employed; instead of 46 parts of water, 57 parts of water were employed, instead of 0.5 part of HEC, 0.9 part was added; and 2.0 parts by weight of bentonite were employed as a thickening agent. The bentonite was added merely to show that added thickening may be attained by conventional procedure without interfering with the practice of the invention.

TABLE II

| Example numbers | Parts by weight of NaCl | Slurry density in pounds/gal. | Temp. in °F. | Rheology | | Fluid loss of 1,000 p.s.i. W/30 min. |
|---|---|---|---|---|---|---|
| | | | | $n$ | $ty$ | |
| E | None | 14.2 | 110 | 0.101 | 0.71 | 120 |
| 9 | 10 | 14.4 | 110 | 0.102 | 0.94 | 62 |
| 10 | 18 | 14.5 | 110 | 0.104 | 0.86 | 70 |
| 11 | [1] 37 | 14.8 | 110 | 0.105 | 0.36 | 77 |
| F | None | 14.2 | 140 | 0.096 | 0.64 | 165 |
| 12 | 10 | 14.4 | 140 | 0.078 | 0.93 | 76 |
| 13 | 18 | 14.5 | 140 | 0.079 | 0.78 | 98 |
| 14 | [1] 37 | 14.8 | 140 | 0.079 | 0.19 | 88 |

[1] Saturated.

Reference to Table II shows that the fluid loss was lessened and the rheological properties, as shown by the $n$ and $ty$ values, were not adversely affected by the presence of both the cellulose ether and the alkali metal halide salt.

Series three

This series of tests was conducted to show the effect of the presence of NaCl and HEC on thickening time of an aqueous class A cement slurry. The composition tested consisted of 46 parts of water, 0.5 part of HEC, 100 parts of cement, 0.2 part of an anti-foaming agent, and the parts by weight of NaCl shown in Table III below. The thickening test was conducted according to API RP 10B section 10, schedules 13 and 14. The results are shown in Table III.

TABLE III

| | Parts by weight of NaCl | Thickening Time in Hrs. and Mins. | |
|---|---|---|---|
| | | Schedule 13 | Schedule 14 |
| Example Numbers: | | | |
| 15 | 10 | 3:36 | 2:09 |
| 16 | 18 | 4:03 | 3:22 |
| 17 | [1] 37 | >5:00 | >5:00 |

[1] Saturated.

The table shows that the thickening time lengthened as the amount of NaCl was increased in the presence of the cellulose ether. Although the thickening time under the conditions of schedules 13 and 14, employing a saturated NaCl solution, were impractically long, it can be easily seen that variations in percent cellulose ether and/or salt and temperature or pressure can be judiciously made to meet the demands of a particular cementing job.

Series four

This series was similar to that of series three, i.e., the tests were conducted according to schedules 13 and 14 of section 10, but the cement slurries tested were those of series two wherein 56 parts of water, 2 parts of bentonite, 0.9 part of HEC, and 50:50 parts by volume class A: pozzolanic cement were employed.

TABLE IV

| Example Numbers: | Parts by weight of NaCl | Thickening Time in Hrs. and Mins. | |
|---|---|---|---|
| | | Schedule 13 | Schedule 14 |
| 18 | 10 | 4:20 | 3:18 |
| 19 | 18 | 5:00 | 3:55 |
| 20 | ¹37 | >5:00 | >5:00 |

¹ Saturated.

Reference to Table IV shows that the thickening time is increased by the presence of increasing amounts of NaCl in the presence of the cellulose ether, similarly to the tests shown in Table III.

Series five

The tests in this series were conducted to show the effect on compressive strength of the resulting set cement after varying periods of time measured from the time of mixing of the ingredients. The values were obtained according to API RP 10B, section 7.

The composition tested in this series was the same as that tested for thickening time in series three.

TABLE V

| Example Numbers: | Parts by weight of NaCl | Temp. in °F. | Compressive Strength in p.s.i. after the Indicated Time in Hours | | | |
|---|---|---|---|---|---|---|
| | | | 8 | 16 | 24 | 48 |
| 21 | 10 | 110 | 538 | 3,406 | 3,354 | (²) |
| 22 | 18 | 110 | NS | NS | 2,451 | 2,540 |
| 23 | ¹37 | 110 | NS | NS | NS | 1,075 |
| 24 | 10 | 140 | 3,150 | 3,380 | 3,408 | (²) |
| 25 | 18 | 140 | NS | NS | 2,838 | 2,845 |
| 26 | ¹37 | 140 | NS | NS | NS | 2,120 |

¹ Saturated.
² Not determined.
NS means not set.

Reference to Table V shows that the setting time is lengthened by employing increased amounts of salt, but that excellent compressive strength values are obtained within quite acceptable periods of time for practical purposes as, for example, in cementing of wells.

Series six

The tests of series five were repeated except that the slurry consisted of 0.9 part of hydroxyethyl cellulose, 2.0 parts of bentonite, 0.2 part of an antifoamer, 100 parts of 50:50 parts by volume mixture of class A: pozzolanic cement, and 57 parts of water. The compressive strength values were obtained, as in series five, and are shown in Table VI.

TABLE VI

| Example identification | Parts by weight of NaCl | Temp. in °F. | Compressive Strength in p.s.i. after Indicated Time in Hours | | | |
|---|---|---|---|---|---|---|
| | | | 8 | 16 | 24 | 48 |
| 27 | 10 | 110 | 145 | 239 | 541 | 1,125 |
| 28 | 18 | 110 | NS | 145 | 208 | 750 |
| 29 | ¹37 | 110 | NS | NS | NS | NS |
| 30 | 10 | 140 | NS | 637 | 1,068 | 2,250 |
| 31 | 18 | 140 | NS | 239 | 500 | 1,850 |
| 32 | ¹37 | 140 | NS | NS | NS | 875 |

¹ Saturated.
NS means not set.

Reference to Table VI shows that the compressive strength of the mixture of class A portland and pozzolanic cement exhibits lower compressive strength than when the cement consists entirely of class A. The rate of setting is shown to be slower than when the cement employed is all class A. However, when a shorter setting time for class A: pozzolanic cement slurries is desired, the rate of setting can be satisfactorily accelerated, for example, by admixing $CaCl_2$ therewith.

Example 33

A well which had been recently completed in the Postle Field in Texas County, Oklahoma to a depth of 6610 feet was to have the casing cemented in place at a level between 5790 and 6586 feet. The bottom hole temperature was 126° F. The cementing was carried out according to the invention as follows: 0.5 part of hydroxyethyl cellulose, 18 parts NaCl and 46 parts of water were admixed with 100 parts of portland cement API class A, by weight, and emplaced in the wellbore in the annulus between the casing and the face of the formation employing high pressure pumping equipment. After about 24 hours, a "cement bond log" was made and recorded by Go Jet Services, Inc. of Oklahoma City, Okla. The cement bond log measures the security of bonds formed at the cement-casing and cement-formation interfaces. The log, which was measured in the interval between 5650 feet and 6586 (well bottom) feet showed excellent bonding between 5790 feet to the well bottom without one defect therein, which would have indicated a weak bond, appearing on the log. This field example demonstrates the high superiority of the cement job performed according to the invention.

The examples show that fluid loss from an aqueous hydraulic cement slurry in contact with a porous surface during the setting period is greatly reduced by the employment of both a water-soluble hydroxyalkyl cellulose ether and a water-soluble inorganic salt without adverse effects in the rheological properties of the slurry.

Having described my invention, what I claim and desire to protect by Letters Patent is:

1. An aqueous hydraulic cement composition comprising by weight: 100 parts of an hydraulic cement selected from the class consisting of portland, aluminous, and pozzolanic cement, between about 35 and 65 parts of water, between about 0.01 and 2.5 parts of an hydroxyalkyl cellulose ether selected from the class consisting of hydroxyethyl, hydroxypropyl, and hydroxybutyl cellulose, having an average of between about 0.25 and about 2.5 hydroxyalkyl groups per cellulose unit, up to about 3.0 parts of an antifoaming agent, up to about 25 parts of colloidal clay, and between 10 percent and the point of saturation of sodium chloride, by weight of the water present.

2. The composition of claim 1 wherein said hydroxyalkyl cellulose ether is hydroxyethyl cellulose.

3. The method of emplacing an aqueous hydraulic cement slurry, which is settable to a monolithic solid, in a space between confining walls wherein at least one of said walls is the face of an earthen formation, and which is accompanied by a reduction in the fluid lost from the slurry to the formation during the setting time thereof, which forms better bonds with said formation because of a lower viscosity during the injection thereof, and has less tendency to foam, which method comprises:

(a) admixing cement and water in a weight ratio of 100 parts of cement selected from the class consisting of portland, aluminous, and pozzolanic cements, between about 35 and 65 parts of water, between about 0.01 and 2.5 parts of an hydroxyalkyl cellulose ether selected from the class consisting of hydroxyethyl, hydroxypropyl and hydroxybutyl ethers, said ether having an average of between about 0.25 and 2.5 stubstituted hydroxyalkyl groups per cellulose unit, up to about 3 parts of an antifoaming agent, up to about 25 parts of colloidal clay, and between 10 parts and the point of saturation of sodium chloride, by weight of the water present.

(b) Forcing the resulting aqueous slurry into said confined space.

4. The method according to claim 3 wherein said cellulose ether is hydroxyethyl cellulose.

References Cited

UNITED STATES PATENTS

| | | | |
|---|---|---|---|
| 2,427,683 | 9/1947 | Ludwig | 106—93 |
| 2,580,565 | 1/1952 | Ludwig | 106—93 |
| 2,673,810 | 3/1954 | Ludwig | 106—93 |
| 2,852,402 | 9/1958 | Shell | 106—93 |
| 2,880,096 | 3/1959 | Hurley | 166—31 |
| 2,985,238 | 5/1961 | Shell | 166—31 |
| 3,090,693 | 5/1963 | Kelly et al. | 106—93 |
| 3,243,307 | 3/1966 | Selden | 106—93 |

TOBIAS E. LEOW, Primary Examiner

WATSON T. SCOTT, Assistant Examiner

U.S. Cl. X.R.

106—90; 166—292, 293